(12) United States Patent
Kallio et al.

(10) Patent No.: US 7,486,927 B2
(45) Date of Patent: Feb. 3, 2009

(54) METHOD AND ARRANGEMENTS FOR WIRELESS COMMUNICATION BETWEEN A VEHICLE AND A TERRESTRIAL COMMUNICATION SYSTEM

(75) Inventors: Janne J. Kallio, Pattijoki (FI); Hasse Sinivaara, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/561,080

(22) PCT Filed: Jul. 18, 2003

(86) PCT No.: PCT/FI03/00573

§ 371 (c)(1),
(2), (4) Date: Dec. 18, 2006

(87) PCT Pub. No.: WO2004/112280

PCT Pub. Date: Dec. 23, 2004

(65) Prior Publication Data

US 2007/0202802 A1 Aug. 30, 2007

(30) Foreign Application Priority Data

Jun. 19, 2003 (FI) .................................. 20030929

(51) Int. Cl.
*H04B 7/15* (2006.01)
(52) U.S. Cl. ..................... 455/11.1; 455/12.1; 455/417; 370/316; 379/45
(58) Field of Classification Search ................ 455/431, 455/427, 11.1, 449, 16, 553.1, 554.2, 565, 455/575.9, 98, 99
See application file for complete search history.

(56) References Cited

U.S. PATENT DOCUMENTS

| 4,748,655 A | | 5/1988 | Thrower et al. ................ 379/60 |
| 4,790,000 A | | 12/1988 | Kinoshita ..................... 379/59 |
| 5,016,115 A | * | 5/1991 | Calkins ....................... 358/442 |

(Continued)

FOREIGN PATENT DOCUMENTS

EP 0 452 290 B1 10/1995

(Continued)

OTHER PUBLICATIONS

Brisco, C. et al., "An automated Emulator of Mobile Satellite Link," Sep. 8-12, 1997, Tel Aviv, Israel, 27th European Microwave 97 Conference and Exhibition, pp. 279-284.

*Primary Examiner*—Duc Nguyen
*Assistant Examiner*—Hai V Nguyen
(74) *Attorney, Agent, or Firm*—Harrington & Smith, PC

(57) ABSTRACT

An emulator functionality is provided at both ends of a satellite communication link that is used between wireless network cells inside a vehicle, such as an aircraft, and a terrestrial communication system. The emulator is capable of providing required state signalling without a connection between a base station of the wireless network inside the vehicle and a base station controller of the terrestrial communication system. In accordance with an exemplary embodiment of the invention the satellite communication link can be switched to an off-state when it is not needed for transferring calls or other information. A further non-limiting exemplary embodiment of the invention provides for a use of alternative satellite connections depending on the location of the vehicle is provided.

45 Claims, 7 Drawing Sheets

U.S. PATENT DOCUMENTS

| | | | | |
|---|---|---|---|---|
| 5,732,213 A * | 3/1998 | Gessel et al. | | 709/224 |
| 5,774,695 A * | 6/1998 | Autrey et al. | | 703/26 |
| 5,826,059 A * | 10/1998 | Harada et al. | | 703/27 |
| 5,883,883 A * | 3/1999 | Baker et al. | | 370/250 |
| 6,055,425 A * | 4/2000 | Sinivaara | | 455/431 |
| 6,070,076 A * | 5/2000 | Valentine | | 455/445 |
| 6,243,801 B1 * | 6/2001 | Boutaud et al. | | 712/38 |
| 6,269,243 B1 * | 7/2001 | Corbefin et al. | | 455/431 |
| 6,314,286 B1 | 11/2001 | Zicker | | 455/422 |
| 6,324,405 B1 * | 11/2001 | Young et al. | | 455/456.1 |
| 6,370,394 B1 * | 4/2002 | Anttila | | 455/417 |
| 6,442,448 B1 * | 8/2002 | Finley et al. | | 700/231 |
| 6,975,647 B2 * | 12/2005 | Neale et al. | | 370/466 |
| 7,068,971 B2 * | 6/2006 | Abutaleb et al. | | 455/3.02 |
| 7,130,788 B2 * | 10/2006 | Reblewski | | 703/28 |
| 7,281,266 B2 * | 10/2007 | Goodman et al. | | 726/16 |
| 7,336,954 B2 * | 2/2008 | Wang et al. | | 455/442 |
| 7,349,361 B1 * | 3/2008 | Allaway et al. | | 370/316 |
| 7,406,309 B2 * | 7/2008 | Usher et al. | | 455/417 |
| 2001/0034243 A1 * | 10/2001 | Masuda et al. | | 455/553 |
| 2002/0009059 A1 * | 1/2002 | Abutaleb et al. | | 370/318 |
| 2002/0016180 A1 * | 2/2002 | Derosier et al. | | 455/522 |
| 2002/0019229 A1 * | 2/2002 | Usher et al. | | 455/435 |
| 2002/0123344 A1 * | 9/2002 | Criqui et al. | | 455/431 |
| 2002/0183054 A1 | 12/2002 | Rimoni et al. | | 455/423 |
| 2003/0013450 A1 * | 1/2003 | Wang et al. | | 455/442 |
| 2003/0128115 A1 * | 7/2003 | Giacopelli et al. | | 340/506 |
| 2003/0184444 A1 * | 10/2003 | Collings | | 340/623 |
| 2003/0194987 A1 | 10/2003 | Pattabiraman et al. | | 455/403 |
| 2003/0203717 A1 * | 10/2003 | Chuprun et al. | | 455/12.1 |
| 2004/0078187 A1 * | 4/2004 | Reblewski | | 703/28 |
| 2004/0254778 A1 * | 12/2004 | Laurent et al. | | 703/25 |
| 2006/0093096 A1 * | 5/2006 | Giacopelli et al. | | 379/45 |
| 2007/0202802 A1 * | 8/2007 | Kallio et al. | | 455/11.1 |
| 2008/0146239 A1 * | 6/2008 | Wang et al. | | 455/442 |

FOREIGN PATENT DOCUMENTS

| | | |
|---|---|---|
| EP | 1 096 699 A3 | 10/2002 |
| WO | WO 99/12227 | 3/1999 |
| WO | WO 99/48312 | 9/1999 |
| WO | WO 00/76087 A1 | 12/2000 |

* cited by examiner

METHOD AND ARRANGEMENTS FOR WIRELESS COMMUNICATION BETWEEN A VEHICLE AND A TERRESTRIAL COMMUNICATION SYSTEM

TECHNICAL FIELD OF THE INVENTION

The present invention relates to the field of mobile radio communication systems in cellular wireless networks. More particularly the invention relates to mobile communication systems using wireless network cells inside a vehicle, such as an aircraft, other airborne vessel, ship or train while aboard, and using satellite communications between the cells inside the vehicle and the terrestrial communication system.

BACKGROUND OF THE INVENTION

The use of mobile phones is restricted inside airline carriers due to a possibility that the transmission of a mobile phone could cause interference problems. Anecdotal instances suggest that the use of the mobile phone on an aircraft might interfere with the navigation equipment and other avionics or communications equipment on the aircraft. Another problem is that due to the height of an airborne aircraft the wireless network coverage does not cover the mobile phones on an airborne aircraft because the terrestrial wireless networks are designed for lateral transmission and reception of radio frequency signals and for relatively slow moving vehicles and pedestrians.

Although the use of the mobile phone from an aircraft might be possible at some altitudes, it does not operate within the considerations designed and built about call handovers between adjacent terrestrial cells. Due to the high velocity of the airborne aircraft an equally strong RF signal from the mobile phone may be picked up on multiple base stations on the ground and the network is unable to process a normal call handover procedure. This may result malfunction of operation, dropping calls frequently and can actually cause base stations to shut down. This may also jam calls of other users covered by the same terrestrial base stations.

Today wireless communication services for passengers are provided in aircrafts by dedicated phones that are installed at each seat and wired to the central transmitter/receiver in the aircraft. This network of phones operates on its own frequency band which differs from other frequency bands used for avionics. To run this service a service provider must provide base stations on the ground to which RF signals are transferred in the vertical direction i.e. a skyward transmission and reception. To allow smooth handovers in the air these base stations must cover a much larger territory than the base stations of the terrestrial wireless network and antennas must be focussed skywards. Service users must use the dedicated phones provided by the service provider and users having personal mobile phones in the aircraft must keep their equipment switched off.

One solution for this problem is to provide a base station and thus an internal cell inside the aircraft for communicating with standard mobile phones, and to use satellite communication between the cells of the aircraft and the terrestrial network. This kind of solution is described e.g. in patent document WO 99/12227. However, other problems may arise with such a prior art system.

Firstly, providing a continuous satellite communication causes remarkable costs. If calls are made very seldom, it is practically not possible to cover the costs of a continuous satellite connection from the phone users. On the other hand, a continuous satellite link is required for signalling purposes. It is a very slow procedure to configure a new signalling connection between a base station inside an aircraft and a terrestrial network, so therefore the satellite connection between the base station and the base station controller should not be switched off even if it is not used for transferring calls.

Secondly, a satellite has only a limited operating range. On the other hand, the Airplanes are travelling around the globe, so communication link with one satellite would not be sufficient for providing good quality service for the passengers. It is not either possible to change the satellite link to another satellite because there is no procedure e.g. in the GSM system for changing the BTS location. The BTS-BSC parameters are static and they are related to each other. In an aircraft application there is no information available which satellite and which BSC would be a new target BSC for which BTS should be updated.

A further problem relates to transferring IP (Internet Protocol) data. There is a need to offer passengers of an aircraft a possibility for transferring IP data between their laptops and Internet. At the moment there is no solution on how to provide such a communication inside an aircraft and how to provide the communication of IP data between the aircraft and the Internet.

SUMMARY OF THE INVENTION

An object of the invention is to solve the problems related to prior art and thus provide a method and system for providing high quality telecommunication service for passengers without causing excessive operational costs.

The object of the invention is fulfilled by providing a satellite communication link between the base station in the aircraft and the base station controller of the terrestrial network. According to the invention there is an emulator functionality provided at both ends of the satellite communication link. The emulator is capable of providing required state signalling without a connection between the base station and the base station controller, and therefore the satellite communication link can be switched to off state when it is not needed for transferring calls or other information.

The preferred way of providing this functionality is including two emulators between BTS-BSC. Their functions in a GSM/GPRS system are to emulate LAPD link between BTS and BSC when there are no active calls, or any other traffic. During RACH/channel reservation or paging signal (e.g. Terminal originated or terminated call or SMS/MMS the emulators will connect LAPD link/Abis between BTS and BSC then normal channel reservation/timeslot allocation between BTS-BSC.

The emulators preferably have BSC connectivity functionalities in the BTS end, and vice versa BTS properties in BSC end. I.e. the emulator at BTS end will be seen from BTS perspective as a BSC and BSC sees the emulator as BTS even though the actual link through the satellite communication is in OFF state. So the emulators emulate the LAPD link/Abis connectivity in TRx signalling/O&M signalling perspective so that the mobile network system finds the "BTS operative as normal" i.e. no Abis lost alarms indicated at the BSC cross-connection. Both emulators preferably have BSC-BTS functionality in the signalling perspective i.e. BSC LAPD properties will be partly implemented into plane and BTS LAPD properties vice versa on ground. The emulator preferably has a functionality to react to channel/call reservation/release messages to open up the LAPD link channel between BTS-BSC. It also preferably controls the satellite capacity reservation. Emulators preferably controls the LAPD link in such manners that capacity will be allocated dynamically. This means that not whole 64 kbit/128 kbit/s or higher channel is dedicated at once but the emulators will reserve LAPD timeslots per usage basis. Example would be e.g. for TS0 16 kbit/s allocation and for any Full Rate/EFR coded calls 16 kbit/s per each call. For Half rate coded calls either 8 kbit/s at the time would be reserved or 16 kbit/s and then filling a second Half Rate coded call into same Timeslot allocation.

The emulator may also take care of allocating resources for transferring IP data between the base station and the Internet through the satellite connection. These resources can serve a WLAN network that may be provided inside an aircraft. The resources for transferring IP data are preferably allocated in such a way that allocating resources for Abis/call connections are always prioritised higher than the allocation of resources for IP data.

Embodiments of the present invention can be easily implemented to existing communication systems. BTS and BSC may have standard GSM signalling properties and messages, such as system information messages. Satellite communication may also have it's own signalling methods to reserve/release the satellite channels. When the satellite communication link is open, standard GSM signalling takes place through satellite communication and standard call reservation/release takes place. Satellites and ground stations can be changed (satellite handover) and the satellite system preferably takes care of routing update for signalling.

It is possible to achieve several important advantages with the present invention. The present invention reduces the communication between the base transceiver station (BTS) and its base station controller (BSC) by allowing breaks in the satellite communication, whereas the link between the base station controller and its various base transceiver stations (BTS) according to typical GSM system is normally always on-line. With the present invention hundreds of mobile subscribers can share one link and additionally this link is only active when needed. As shown above, the present invention achieves the needed functionality by making use of emulators allowing mainly standard GSM network units or resources to be used, and therefore the inventive functionality is achieved with small investments.

A further advantage of certain embodiments of the invention is that they enable keeping the mobile stations inside an aircraft camped to the base station of the aircraft even if there would not be a connection to a terrestrial network available at the moment. This way it is possible to avoid that mobile stations would try to camp to terrestrial base stations and thus cause possible interference.

The present invention also provides possibility for installing regional Base Station Systems (BSS) where the BTS's are located for the period of time they travel underneath. The Abis emulators are initiating the routing reconfiguration after the satellite handover is performed, satellite and ground station is changed and satellite link is again active.

In accordance with the invention there is also provided a communication method for communication between a first network unit inside a vehicle and a second network unit of a terrestrial mobile communication system, wherein said communication is directed via a satellite, the method being characterized in that the method comprises:

establishing the satellite connection when information transfer between the first network unit and the second network unit is required, releasing the satellite connection when information transfer between the first network unit and the second network unit is not required, emulating signalling of the second network unit for the first network unit during a released state of the satellite connection, and emulating signalling of the first network unit for the second network unit during the released state of the satellite connection.

In accordance with the invention there is also provided a communication arrangement comprising a first network unit for wireless communication with mobile stations inside a vehicle and a fixed second network unit of a terrestrial mobile communication system, the system comprising means for communicating between the first network unit and the second network unit via a satellite, the arrangement being characterized in that the arrangement further comprises means for establishing the satellite connection when information transfer between the first network unit and the second network unit is required, means for releasing the satellite connection when information transfer between the first network unit and the second network unit is not required, means for emulating signalling of the second network unit for the first network unit during a released state of the satellite connection, and means for emulating signalling of the first network unit for the second network unit during the released state of the satellite connection.

The invention further relates to a first network unit arrangement, the first network unit comprising means for communicating information with a second network unit, the arrangement being characterised in that the arrangement comprises means for emulating signalling of the second network unit for the first network unit during periods when there is no communication between the first network unit and the second network unit.

Some preferred embodiments of the invention are described in dependent claims.

BRIEF DESCRIPTION OF THE DRAWINGS

Some embodiments of the invention will be described in detail below, by way of example only, with reference to the accompanying drawings, of which

DETAILED DESCRIPTION

Figure 1A:
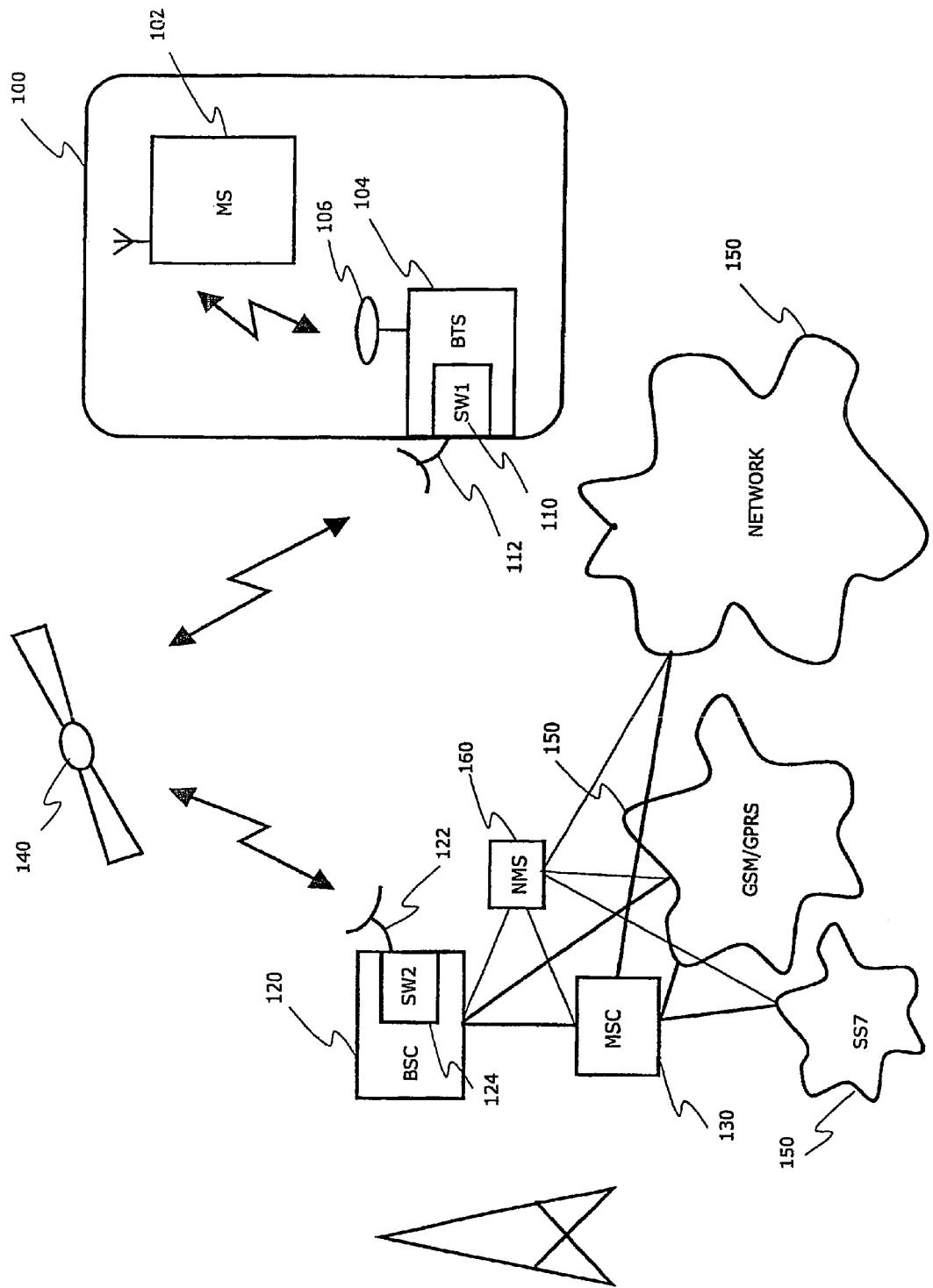
FIG. 1a shows an embodiment of the wireless communication system according to the invention.

FIG. 1a shows a general block diagram for an embodiment of the wireless cellular communication system according to the invention. Information is transferred between a mobile terminal 102 and a first network device 104 in an indoor cell or network 100 inside an aircraft via antenna 106. The mobile terminal 102 is connected via the first network device 104 to the second network device 120 of a terrestrial network outside the aircraft and the second network device is capable of communicating with external networks 150. The transmission from the first network device 104 of the indoor cell or indoor network to the second network device 120, and vice versa, is routed via a satellite link 140 using antennas 112 and 122.

One or more first network devices 104 may be located inside the aircraft, each of them forming own indoor cell and each of them forming own connection to the second network devices 120. If only one first network device 104 is located inside the aircraft it will establish a indoor cell 100, but if two or more first network devices are located inside the aircraft they will establish a network 100 which is composed of two or more cells.

According to the invention the indoor network 100 and the external network 150 are compatible with each other. Preferably, both networks are compliant with at least one of the following communication specifications: GSM (Global System for Mobile communications), PCN (Personal Communication Network), PCS (Personal Communication System), HSCSD (High Speed Circuit Switched Data), GPRS (General Packet Radio Service), EDGE (Enhanced Data rates for GSM Evolution), CDMA (Code Division Multiple Access), WCDMA (Wide band CDMA), Bluetooth, UMTS (Universal Mobile Telecommunications System), Teldesic, Iridium, Inmarsat and WLAN (Wireless Local Area Network).

In the preferred embodiment the mobile terminal 102 is a mobile station of a cellular network inside the aircraft, the first network device 104 is a base transceiver station (BTS) of a cellular network inside the aircraft and the second network device 120 is a base station controller (BSC) of a terrestrial cellular network outside the aircraft.

GSM network is one example of a wireless network to be used in the wireless communication system according to the invention. The indoor network 100 according to the invention may be operated by any telecom operator who, in addition to the indoor network devices 104, fits up the system with external network devices such as mobile switching center (MSC) 130, base station controller (BSC) 120 and network management system 160, and has access to SS7 (Signalling System 7) networks 150. The telecom operator must also have a roaming agreement with a terrestrial GSM operator, as well as transmission agreements with satellite communication (satcom) operators or service providers.

Figure 1B:
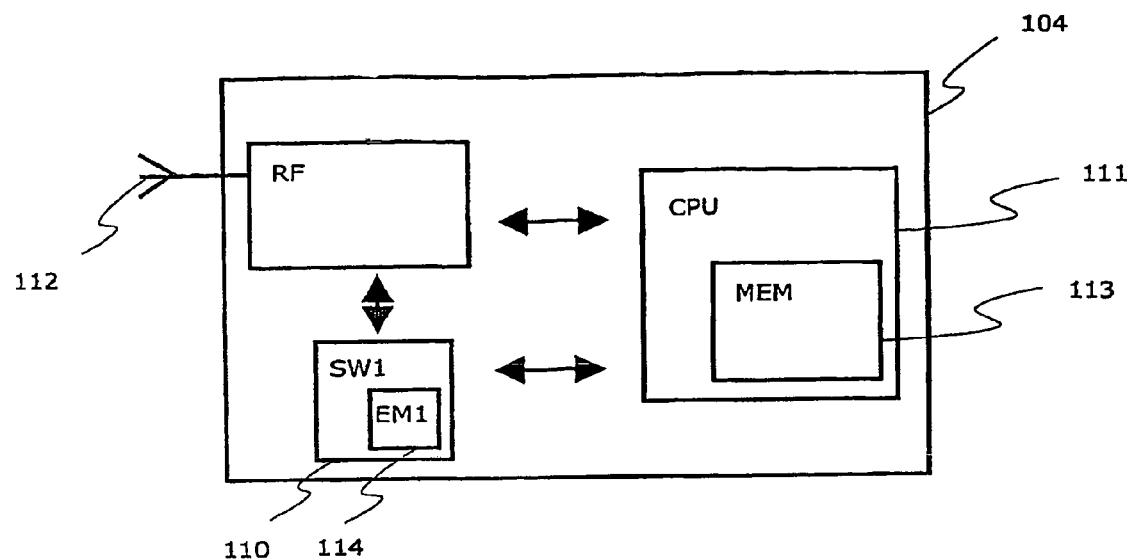
FIG. 1b shows an embodiment of a base station including an emulator according to the invention.
Figure 1C:
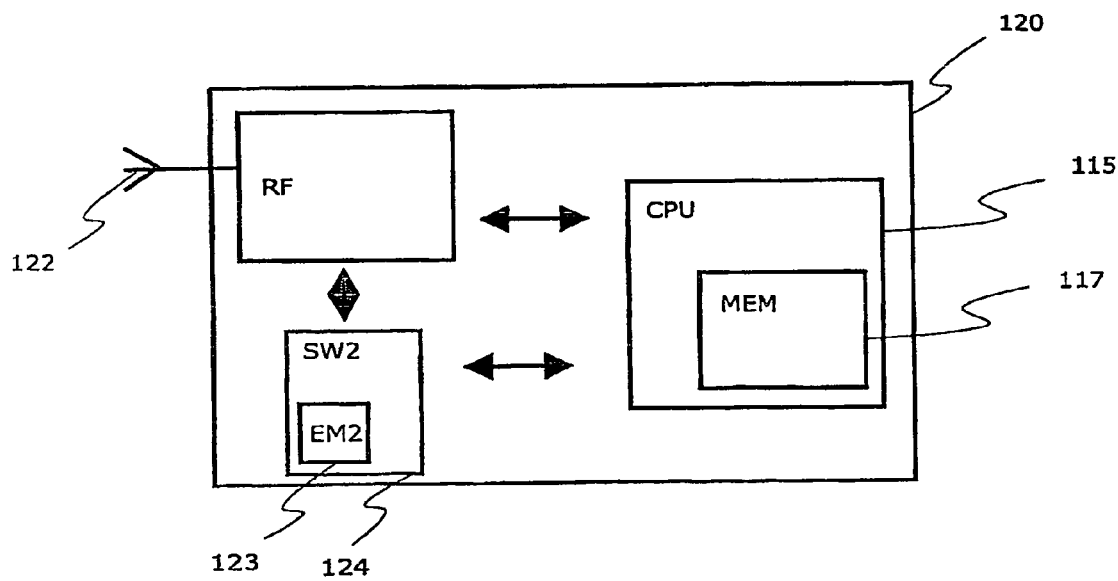
FIG. 1c shows an embodiment of a base station controller including an emulator according to the invention.

The signalling information is relayed from the BTS 104 to the BSC 120, and vice versa. There is used a satellite link connection to route the wireless connection between the BTS and the BSC and the communication is compliant with external networks, e.g. terrestrial GSM networks. The satellite link is typically off when there is not any traffic, but the mobile communication presumes a non-stop connection. According to the invention the satellite link connection between the BTS and the BSC comprises e.g. switching modules 110, 124 to switch signalling channels and intervals according to allocations so that the link is off when no traffic occurs. As shown in FIG. 1b the switching module 110 of the BTS is coupled to a central processing unit CPU 111 with a memory MEM 113 and includes an emulator 114 which emulates LAPD link to the BTS as if the BTS would be wirelessly connected to the BSC while there is not any transmission between the BTS and BSC. In the corresponding way as shown in FIG. 1c the switching module 124 of the BSC is coupled to a central processing unit CPU 115 with a memory MEM 117 and includes an emulator 123 which emulates LAPD link to the BSC as if the BSC would be wirelessly connected to the BTS while there is not any transmission between the BTS and BSC. The emulators 114, 123 play the role towards the BTS and the BSC as if they were wirelessly connected all the time according to the specifications of GSM networks, while in reality the satellite communication link is off if there is not any traffic.

Figure 2:
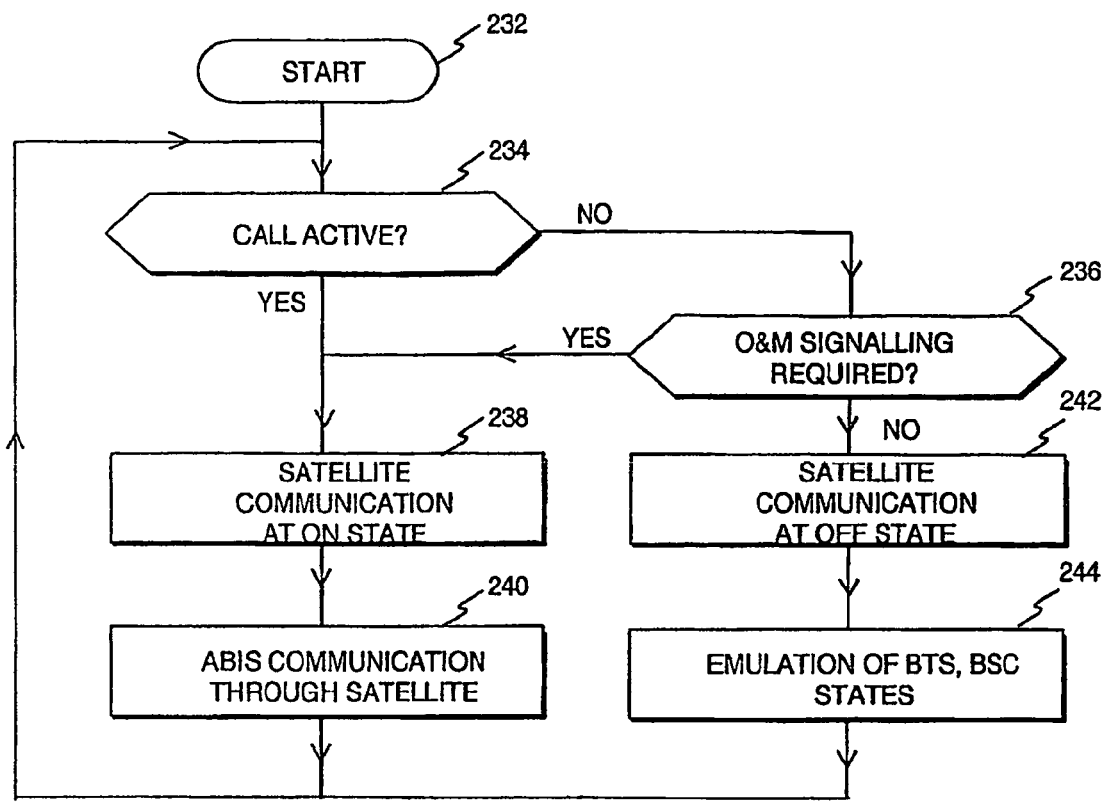
FIG. 2 shows a flow diagram of an exemplary method according to the invention for controlling satellite communication and providing state signalling.

FIG. 2 illustrates a flow diagram for an exemplary method according to the invention for controlling satellite communication. When the system has been configured, 232, it is checked in step 234 whether a call is active or whether a call is requested. If yes, the satellite communication shall be at on state, and a normal Abis communication is transferred through the satellite link. If a call is not active nor requested, it is checked in step 236 whether TRx/O&M signalling is required. If yes, the satellite communication shall be at on state, 238, and a normal Abis signalling is transferred through the satellite link, 240. If no O&M signalling is required either, the satellite communication shall be at off state, 242, and LAPD link of the base station and the base station controller are emulated by the emulators, 244.

Figure 3:
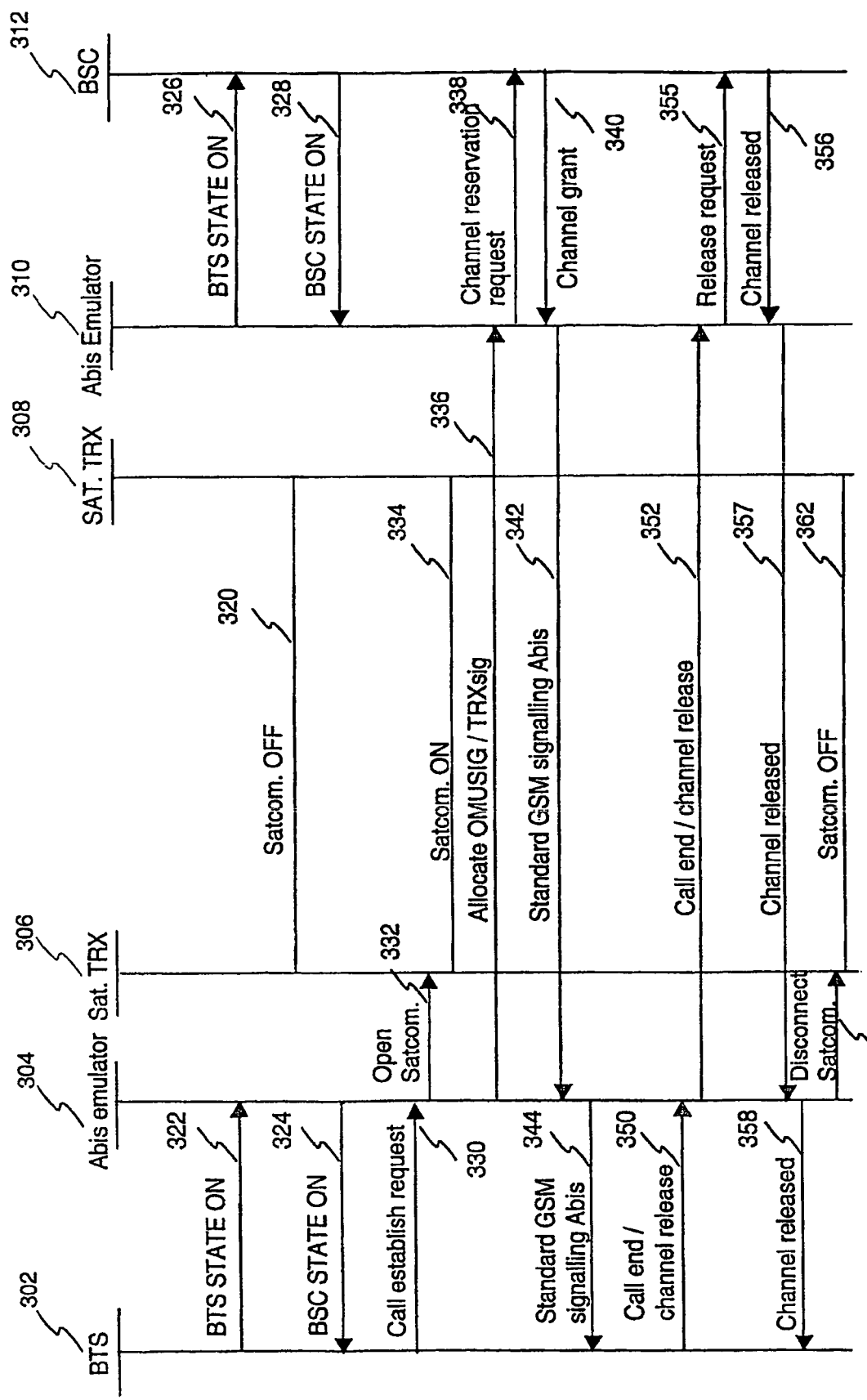
FIG. 3 shows providing call related signalling in an exemplary arrangement according to the invention.

FIG. 3 illustrates signalling in an exemplary arrangement according to the invention, relating to an idle state, call establishment and call release. The arrangement of FIG. 3 comprises in the aircraft a BTS 302 and a satellite transceiver 306 and an Abis emulator 304 between the BTS and the satellite transceiver. At the terrestrial side the arrangement comprises a BSC 312 of a GSM network, a satellite transceiver 308 and an Abis emulator 310 between the BSC and the transceiver. State 320 illustrates that the satellite communication connection is OFF i.e. it does not transfer any data between the BTS and BSC. At this state the Abis emulator 304 provides Abis signalling for the BTS instead of the BSC. The BTS informs that the BTS is at ON state, 322, to the emulator instead of the BSC, and the emulator (instead of the BSC) informs the BTS that the BSC is at ON state, 324. The Abis emulator 310 functions correspondingly at the terrestrial side; the Abis emulator 310 provides Abis signalling for the BSC instead of the BTS. The emulator (instead of the BTS) informs the BSC that the BTS is at ON state, 326, and the BSC informs that the BSC is at ON state, 328, to the emulator instead of the BTS. When a call is initiated at the BTS side, the mobile station sends a Channel reservation request to the BTS sends the message further to Abis emulator, 330. The Abis emulator then triggers satellite communication system to allocate channel/channels and opens the satellite communication connection between the emulators, 332, 334. After the satellite communication has been opened and LAPD link connected the Abis signalling, i.e. OMUsig/TRXsig signalling connection is allocated between the emulators, 336. The request for call establishment initiates a channel reservation request message to the BSC, 338, which further gives a channel grant message, 340. The signalling continues as a normal Abis signalling between the BSC and BTS, 342,344.

When a call ends the BTS gives a call end/channel release message 350, which is transferred 352 to the Abis emulator 310, which gives a release request message to the BSC, 355. The BSC responds in a normal manner with a channel released message, 356-358. After the channel is released the Abis emulator 304 disconnects the satellite communication, 360, which then returns to the OFF state, 362.

If a call would be an incoming call from the network, the emulator of the BSC could take care of establishing/controlling the satellite communication connection in a corresponding manner.

Figure 4:
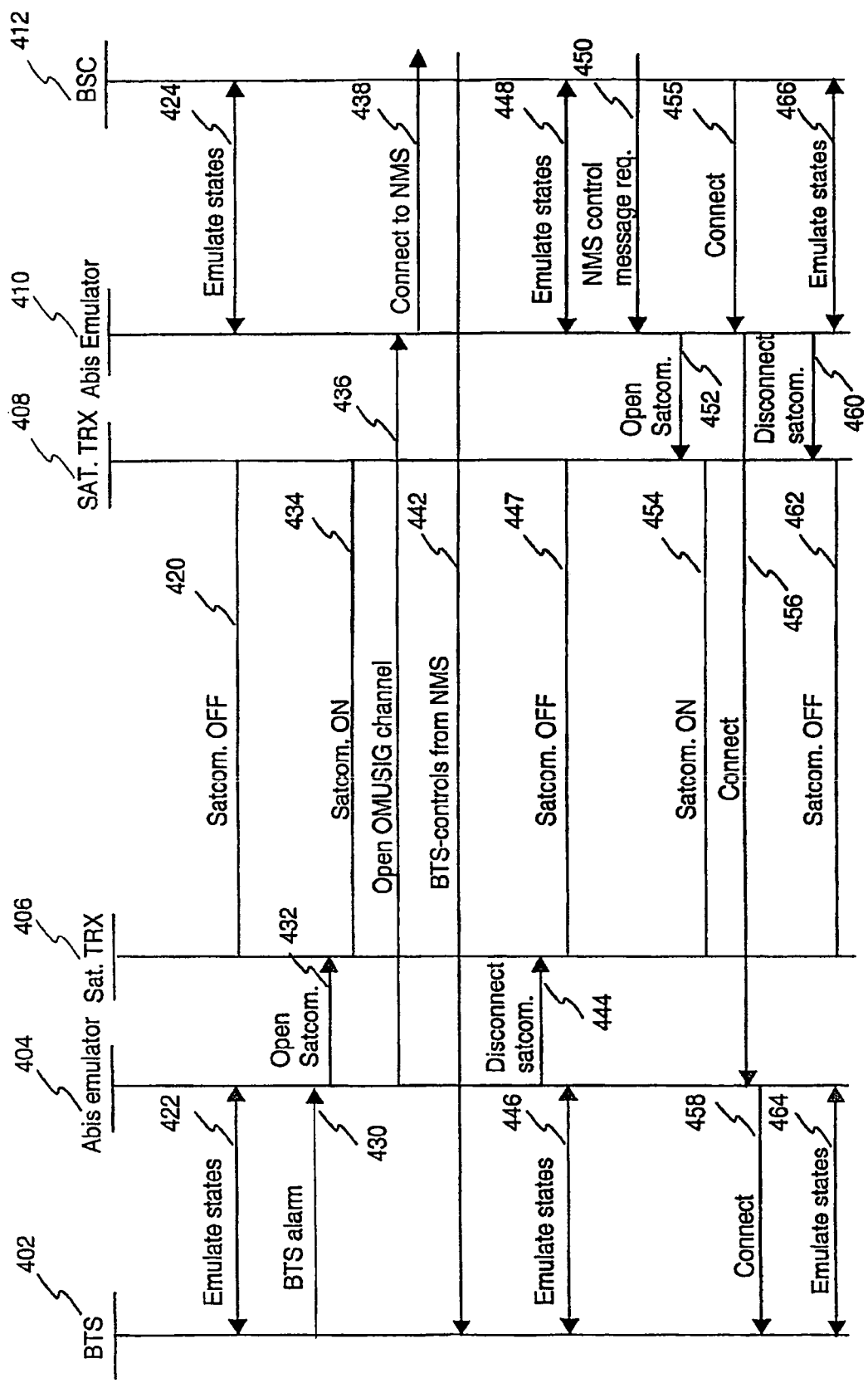
FIG. 4 shows providing operating and maintenance related signalling in an exemplary arrangement according to the invention.

FIG. 4 illustrates signalling in an exemplary arrangement according to the invention, relating to operating and maintenance (O&M), such as the config/polling/alarm state. For those signalling properties, the emulators have a functionality to open the satcom link for connection between BTS-BSC-NMS in order to operate the BTS. The same relates to alarms that are automatically sent to NMS from the BTS. The arrangement of FIG. 4 is equal to the arrangement of FIG. 3, comprising in the aircraft a BTS 402, a satellite transceiver 406, and an Abis emulator 404 between the BTS and the satellite transceiver. At the terrestrial side the arrangement comprises a BSC 412 of a GSM network, a satellite transceiver 408 and an Abis emulator 410 between the BSC and the transceiver. State 420 illustrates that the satellite communication connection is OFF i.e. it does not transfer any data between the BTS and BSC. The state signalling between the BTS and the BSC is emulated by the Abis emulators, 422, 424, as was explained in the description of FIG. 3.

When an BTS alarm message is received from the BTS, 430, the Abis emulator opens the satellite communication connection between the emulators, 432, 434. After the satellite communication has been opened and LAPD link connected the Abis (OMUSIG/TRXsig) signalling connection is allocated between the emulators, 436, and NMS is connected, 438. The BTS control signalling is transferred between NMS and BTS, 442, using the satellite communication link. After the controlling procedure the Abis emulator 404 or 410 disconnects the satellite communication connection, 444, and the connection turns to OFF state, 447. The state signalling between the BTS and BSC is then emulated by the emulators, 446, 448.

When the NMS informs a control message requirement, 450, the Abis emulator at the BSC side opens the satellite communication connection, 452, 454. A signalling connection is established between the BSC and the BTS, 455-458, and the signalling messages are transferred. After the NMS initiated control procedure is completed, the Abis emulator 410 disconnects the satellite communication, 460. The satellite connection thus returns to the OFF state 462 and the states of the BTS and the BSC are emulated by the emulators, 464, 466.

According to one embodiment of the invention the Abis emulator receives flight status information from the avionics of the aircraft. When the aircraft starts landing the emulator may receive this information and processes a signalling message to the base station. This signalling message may include a Cell Barred information, which causes that information transfer time slots cannot be used and thus calls are no more possible. However, the base station preferably stays in on-state and keeps the mobile stations inside the aircraft camped to it in order to prevent the mobile stations from scanning other networks. After the aircraft has landed, the base station can be switched off in order to let the mobile stations scan and camp to another network. When the aircraft starts to depart, the mobile stations in the aircraft can be camped to the base station in a Cell Barred state in a similar way. The message for controlling the base station can also be provided by other alternative means than the emulator. The avionics system information that can be used to control the Abis-emulators and BTS may include information on e.g. Flight Altitude for the emulator in order to activate/deactivate the BTS operation accordingly. BTS operation can be also triggered from other signal such as door-open/closed, weight-on-wheels/off-wheels. Depending on the requirements several different trigger signals can be used for controlling purposes.

It is possible to use the satellite link, except for transferring data according to e.g. GSM, SMS, GPRS protocols of mobile networks, also for transferring Internet Protocol (IP) data to e.g. Internet. It is possible to route the IP data through the same route through the satellite connection and the mobile network as shown in FIG. 1a. In this case the Abis emulator acknowledges standard channel reservation, paging etc. signalling messages and connects through the satellite communication also for transferring the IP data. However, the Abis emulator preferably prioritises the call connections over transferring IP data through the satellite connection in order to ensure the sufficient Quality of calls.

Figure 5A:
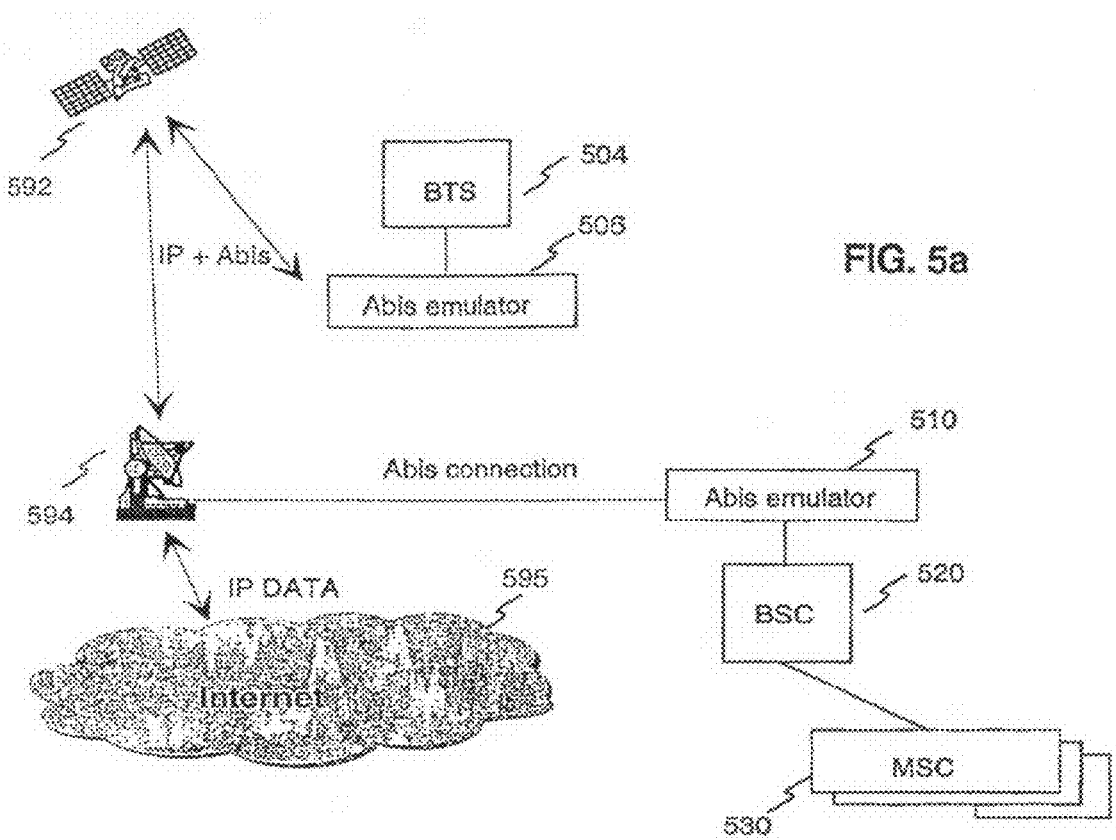
FIG. 5a shows a second exemplary arrangement for providing call and packet data transmission, wherein packet data is transferred directly via satellite land station and Internet.

FIG. 5a illustrates another embodiment for transferring IP data. In this embodiment IP data including data to/from a base transceiver station BTS 504 via a satellite 592 is routed directly between the satellite land station 594 and the Internet 595. In such an arrangement the Abis emulator 506 preferably controls the Quality of Service (QoS) in such a way that Abis connections always have priority over IP data users in order to ensure a sufficient quality for connections to mobile network. The emulator thus needs to always dedicate the required Abis connectivity per usage.

Figure 5B:
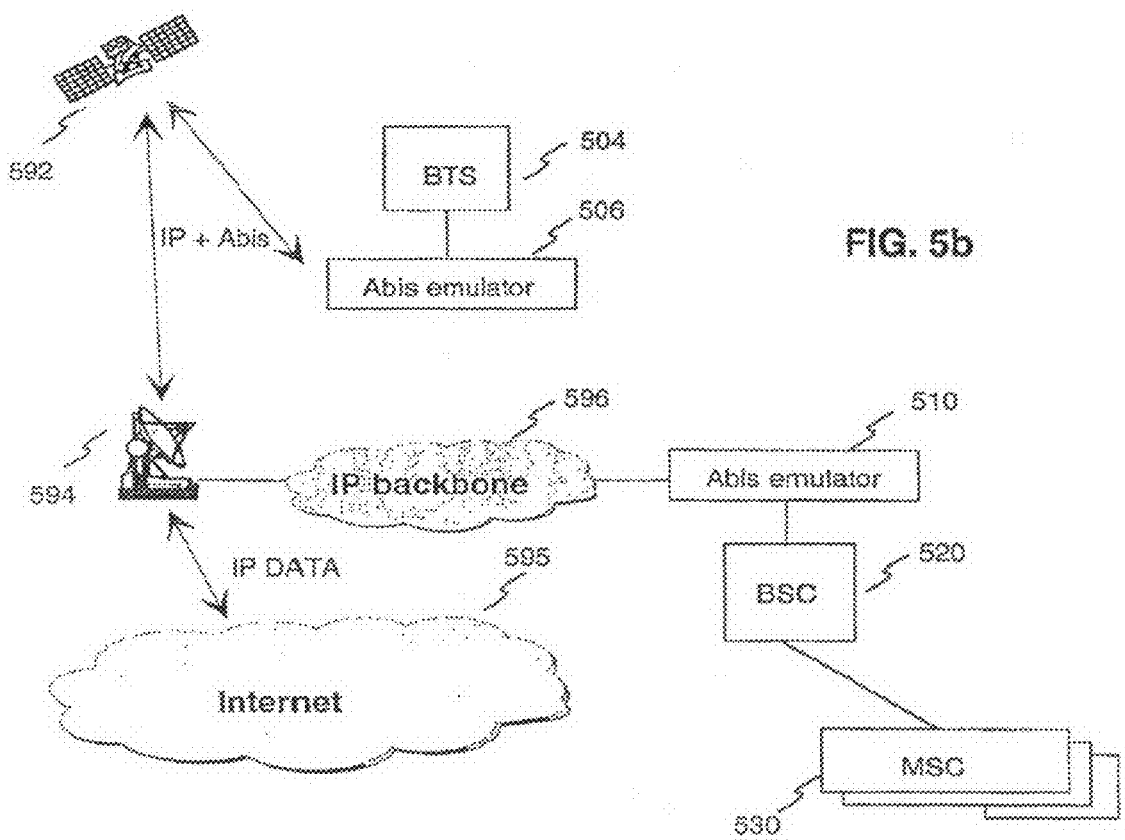
FIG. 5b shows a third exemplary arrangement for providing call and packet data transmission, wherein call data and packet data are both transferred using IP protocol.

FIG. 5b illustrates a further embodiment for transferring data for Abis connections and IP. In this embodiment IP data is also routed directly between the satellite land station 594 and the Internet 595, but the data of the Abis connections such as to/from the base station controller BSC 520 connected to the mobile switching center MSC 530 is also routed through an IP type backbone 596 between the satellite land station 594 and the Abis emulator 510. In this case Abis data is transmitted over IP link end-to-end and the emulators perform the necessary IP encapsulation of the data. Also in this arrangement the Abis emulator 506 preferably controls the Quality of Service (QoS) in such a way that Abis connections always have priority over other IP capacity/data users in order to ensure a sufficient quality for connections to mobile network.

The quality control of the emulator means that the capacity allocated for IP data transfer is decreased if the number of calls is increased, or if the quality of the Abis call connection is not sufficient.

Figure 6:
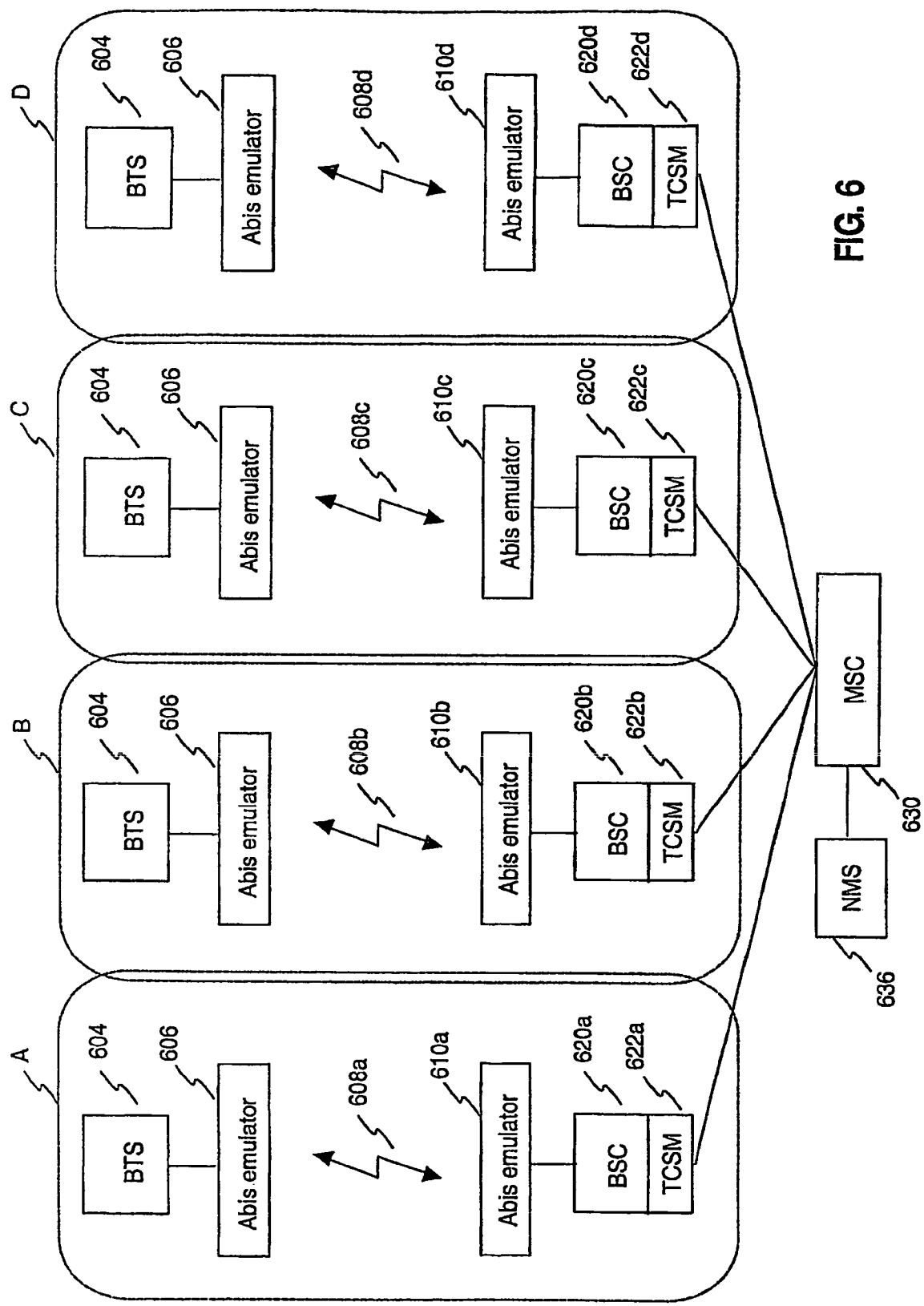
FIG. 6 shows an exemplary arrangement according to the invention for providing handovers between several satellites and related terrestrial networks.

FIG. 6 shows an exemplary arrangement according to the invention where the base station may use several satellites depending on the aircraft's position. FIG. 6 illustrates four satellite connections 608a, 608b, 608c and 608d, which can be used in different locations of the moving base station 604 and emulator 606. The four different satellite connections connect to four base station controllers 620a, 620b, 620c and 620d respectively. In the example one BSC is located into each satellite coverage area, preferably installed next to satellite ground earth station. The Abis emulators 610a, 610b, 610c and 610d control the satellite connection and emulate BTS status signalling. The base station controllers are connected via TCSMs 622a, 622b, 622c and 622d to the mobile switching center 630 and NMS 636 of the mobile network. When the base station moves within operating ranges of the different satellites, corresponding base station systems A, B, C and D are formed to handle the connections to the mobile network. In this case e.g. a GSM system has 4 BSS's established globally (the number of BSS is not limited). BSC's are geographically located in different places where the connection to MSC is created. Under each BSC a number of BTS's are e.g. flying or sailing etc and depending on the satellite coverage boarders the satellite communication system will perform satellite communication handovers i.e. the BTS changes at the same time under new BSC. BSS has to perform system update i.e. BTS initiates a transmission reconfiguration under the new BSC and further on the NMS must updated database of new BTS-BSC relation. Preferably each BTS will be configured with exactly same parameters into each BSC cross-connection, MSC and NMS so that no BTS parameter updates are needed after changing the BSC location area due to satellite region change. When BTS changes the BSC location area and satellite area, the BSC side emulator will emulate the BTS (LAPD+Abis) towards BSC until the BTS appears next time active into that BSC. By this way the system only thinks that the BTS is active while the BTS belongs to another BSC/MSC area. By using totally separated MSC/BSC regions the system can be duplicated as such and no parameter updates are needed for BTS end.

The emulation functionality is next described in more detail in the context of satellite handovers, referring to FIG. 6.

Based on the GSM signalling between BTS and BSC the emulator is used to switch the satellite connection on-off. The emulators will indicate the activation signalling based on the GSM signalling messages when calls are initiated and disconnected, paging requests send to receiving MS. When the MSC-BSC-BTS connectivity can be disconnected the emulator activates the emulator mode towards BTS and BSC according the GSM signalling. Secondly the emulator acts as a connectivity initiator when satellite handovers are taking place. After satellite handover the aircraft emulator will initiate the connection into a ground based emulator and satellite Abis connection will be verified between BTS and BSC node. Emulator will provide routing mechanism for connecting the BTS into a correct BSC after every satellite handover. The present invention can include also additional usage of various Avionics system information that can be used to control the Abis-emulators and BTS. For example, Abis-emulator may receive information, e.g. Flight Altitude for activating/disactivating the BTS operation accordingly. BTS operation can be also triggered from other signal such as door-open/closed, weight-on-wheels/off-wheels. Depending on the requirements several different trigger signals can be used for controlling purposes. The trigger signal can also be dependent on location or heading data.

In a case where the NSS/BSS system would be regional NSS/BSS system is duplicated in each Satellite region e.g. US, Europe and Asia-Pacific. Due to the fact that GSM BTS is typically stationary and MS mobility and handovers will take place in the network, the aircraft network BTS will move the BSC areas. This will require special implementation in the GSM system. Each regional NSS/BSS will need to be configured in a similar way i.e. duplicate configuration. Due to stationary system there are limitations in the BSC-BTS connectivity in the cross-connection. Based on that fact the BTS should be always connected into the BSC with similar manner. This requirement sets rules for system in the BSC side. Each NSS/BSS region will have own routing addressing. After the satellite handover takes place the aircraft side emulator will initiate the link establishment to regional BSC and emulator. Aircraft emulator needs the information into which regional BSC it will require to be initiating the Abis link. This information can be received from the aircraft avionics system as satellite region information. Based on that information the aircraft emulator will establish a correct routing to the corresponding regional BSC. The BSC end emulator will terminate LAPD link and route it to BSC cross-connection.

The duplicated NSS/BSS in the system means that each BTS needs to be configured according the GSM system setup rules to each BSC. While the BTS is moving and satellite handovers takes place the BTS will change the BSC accordingly. Each BSC needs to have the information of that BTS LAPD link properties(BTS id, Cell id, BCF id etc). Those parameters can be exact copies between each BSC area. After satellite handover the LAPD link into a neighbour BSC region will be established by the emulators.

After the transmission link is up between BTS-BSC the BSC will identify the BTS based on it's identity parameter and will perform parameter download to the BTS accordingly. Present invention targets that No parameter updates should be performed but rather having exact duplicate of the system. However this could be possible according to normal GSM rules. This act could be identified in the GSM system as Abis connection lost-Abis connection activated in standard manners. However, what is different is when the Abis is "lost" i.e. the satellite region is changed the BTS changes the BSC i.e. Location area. Therefore the BTS coming into new BSC-location area the BSC will update the BTS parameter set accordingly. It is required that all the BTS's are configured into NMS accordingly so that each BTS will be found in each BSC. When BTS changes the BSC the BTS will be inactivated in the previous BSC-NMS and activated in the neighbour BSC-NMS. From the NMS-BSC point of view the BTS can be seen as transparent element that can be automatically reconfigured during the BSS switch in the satellite communication is handover process.

The invention is not restricted to the embodiments described above. While a preferred embodiment of the present invention is disclosed herein for purposes of explanation, numerous changes, modifications, variations, substitutions and equivalents in whole or in part should now be apparent to those skilled in art to which the invention pertains. Accordingly, it is intended that the present invention be limited only by the characteristics and scope of the hereto appended independent claims.

The invention has been mainly described in the context of aircraft application. However, the invention is not in any way limited to aircraft use but the idea can also be used in other vehicles such as bullet trains or ships. The aircraft profile can thus be a "vehicle profile" for any moving vehicle. The scope of protection thus also covers such applications.

The invention has been described using terminology of a GSM/GPRS communication system. However, the invention may as well be applied to other systems, wherein the system components or signals may have different names.

It should also be noted that the inventive emulator functionality can be implemented as an additional unit or as a software implementation to existing units.

The invention claimed is:

1. A method comprising:
   establishing a satellite connection via a satellite when an information transfer between a first network unit and a second network unit is required;
   releasing to a released state the satellite connection when the information transfer between the first network unit and the second network unit is not required; and
   emulating, without the information transfer between the first network unit and the second network unit, signalling of the second network unit to the first network unit during the released state of the satellite connection.

2. The method according to claim 1, wherein said signalling is LAPD link and Abis signalling.

3. The method according to claim 2, wherein capacity is reserved dynamically for an Abis link during an on-state of the satellite connection, the capacity being reserved based on a data transfer requirement.

4. The method according to claim 1, wherein said emulating signalling of the second network unit comprises transferring state messages with the first network unit.

5. The method according to claim 1, comprising transferring Internet Protocol (IP) data between the first network unit and Internet via the satellite, where communication between the first network unit and the second network unit is prioritized higher in the satellite connection than the IP data transfer between the first network unit and the Internet.

6. The method according to claim 1, wherein the information transfer between the first network unit and the second network unit is transferred as Internet Protocol (IP) packet data.

7. The method according to claim 1, wherein the first network unit is located in an aircraft, and the method further comprises receiving flight status information from avionics of the aircraft for controlling the first network unit.

8. The method according to claim 7, wherein on the basis of the received flight status information communications between the first network unit and mobile stations inside the aircraft are barred while keeping mobile stations camped to the first network unit.

9. The communication method according to claim 7, wherein the flight status information comprises at least one of the following information: flight altitude, position and heading, doors open/closed, activate/deactivate mobile communications.

10. The method according to claim 1, the method comprising:
receiving communication information on another satellite and another second network unit;
establishing communications between the first network unit and the other second network unit via the other satellite on the basis of the received communication information; and
releasing the communication information between the first network unit and the second network unit via the satellite.

11. The method according to claim 1, that wherein the information transfer is compliant with at least one of the following communication specifications: GSM (Global System for Mobile communications), PCN (Personal Communication Network), PCS (Personal Communication System), HSCSD (High Speed Circuit Switched Data), GPRS (General Packet Radio Service), EDGE (Enhanced Data rates for GSM Evolution), CDMA (Code Division Multiple Access), WCDMA (Wide band CDMA), Bluetooth, UMTS (Universal Mobile Telecommunications System), Teldesic, Iridium, Inmarsat and WLAN (Wireless Local Area Network).

12. The method according to claim 1, wherein a wireless connection between a mobile terminal and the first network device unit is established by a wireless network.

13. A communication arrangement comprising:
a first circuit configured to establish a satellite connection via a satellite as a response to a situation in which an information transfer between a first network unit and a second network unit is required;
a second circuit configured to release to a released state the satellite connection as a response to a situation in which the information transfer between the first network unit and the second network unit is not required; and
a third circuit configured to emulate, without the information transfer between the first network unit and the second network unit, signalling of the second network unit to the first network unit during the released state of the satellite connection.

14. The communication arrangement according to claim 13, wherein said signalling is LAPD link and Abis signalling.

15. The communication arrangement according to claim 14, wherein said circuit configured to emulate signaling is arranged to reserve capacity dynamically for an Abis link during an on-state of the satellite connection, the capacity being reserved, based on a data transfer requirement.

16. The communication arrangement according to claim 13, wherein said circuit configured to emulate signalling of the second network unit comprises a circuit configured to transfer state messages with the first network unit.

17. The communication arrangement according to claim 13, wherein said circuit configure to emulate signalling of the second network unit comprises a circuit configured to transfer state messages with a base station controller.

18. The communication arrangement according to claim 13, comprising a fourth circuit configured to transfer Internet Protocol (IP) data between the first network unit and Internet, where communication between the first network unit and the second network unit is prioritized higher in the satellite connection than the IP data transfer between the first network unit and the Internet.

19. The communication arrangement according to claim 13, comprising a fifth circuit configured to transfer data between the first network unit and the second network unit as Internet Protocol (IP) packet data.

20. The communication arrangement according to claim 13, wherein the first network unit is located in an aircraft.

21. The communication arrangement according to claim 20, it comprising a fourth circuit configured to receive flight status information from the aircraft for controlling the first network unit.

22. The communication arrangement according to claim 21, wherein the circuit is further configured to bar communications between the first network unit and mobile stations inside the aircraft on the basis of the received flight status information and keep the mobile stations camped to the first network unit during the barred state.

23. The communication arrangement according to claim 21, wherein the flight status information comprises at least one of the following information: flight altitude, position and heading, doors open/closed, activate/deactivate mobile communications.

24. The communication arrangement according to claim 13, further comprising:
a fourth circuit configured to receive communication information on another satellite and another second network unit;
a fifth circuit configured to establish communications between the first network unit and the other second network unit via the other satellite on the basis of the received communication information; and
a sixth circuit configured to release the communication information between the first network unit and the second network unit via the satellite.

25. The communication arrangement according to claim 13, wherein the information transfer is compliant with at least one of the following communication specifications: GSM (Global System for Mobile communications), PCN (Personal Communication Network), PCS (Personal Communication System), HSCSD (High Speed Circuit Switched Data), GPRS (General Packet Radio Service), EDGE (Enhanced Data rates for GSM Evolution), CDMA (Code Division Multiple Access), WCDMA (Wide band CDMA), Bluetooth, UMTS (Universal Mobile Telecommunications System), Teldesic, Iridium, Inmarsat and WLAN (Wireless Local Area Network).

26. The communication arrangement according to claim 13, wherein the first network unit is a base transceiver station and the second network unit is a base station controller.

27. The communication arrangement according to claim 13, wherein the first network unit is inside a vehicle and connected to a wireless network including mobile terminals inside the vehicle.

28. A first network unit comprising:
a first circuit configured to communicate an information transfer with a second network unit via a satellite; and
a second circuit configured to emulate, without the information transfer between the first network unit and the second network unit, signalling of the second network unit to the first network unit during periods when there is no information transfer via the satellite between the first network unit and the second network unit.

29. The first network unit according to claim 28, that wherein said signalling is LAPD link and Abis signalling.

30. The first network unit according to claim 29, wherein said circuit configured to emulate signalling is configured to reserve capacity dynamically for an Abis link during an on-state of a satellite connection, the capacity being reserved based on a requirement for the information transfer between the first network unit and the second network unit.

31. The first network unit according to claim 28, that wherein the first network unit is a base transceiver station and the second network unit is a base station controller.

32. The first network unit according to claim 28, embodied in a moving vehicle.

33. The first network unit according to claim 32, comprising:
a third circuit configured to receive communication information on another satellite and another second network unit;
a fourth circuit configured to establish communications between the first network unit and the another second network unit via the another satellite on the basis of the received communication information; and
a fifth circuit configured to release the communication information between the first network unit and the second network unit via the satellite.

34. The first network unit according to claim 32, wherein the moving vehicle is an aircraft that and the first network unit further comprises a circuit configured to receive flight status information from the aircraft in order to control the first network unit.

35. The first network unit according to claim 34, further comprising a circuit configured to bar communications between the first network unit and mobile stations inside the aircraft on the basis of the received flight status information; and keep mobile stations camped to the first network unit during the barred state.

36. The first network unit according to claim 34, in that wherein the flight status information comprises at least one of flight altitude, position and heading, doors open/closed, activate/deactivate mobile communications.

37. The first network unit according to claim 28, wherein the first network unit is a base transceiver station capable of communicating with a base station controller via the satellite.

38. A communication arrangement comprising:
a first network unit for wireless communication with mobile stations inside a vehicle;
a second network unit of a terrestrial mobile communication system, the terrestrial mobile communication system comprising means for communicating between the first network unit and the second network unit via a satellite;
means for establishing a satellite connection as a response to a situation in which an information transfer between the first network unit and the second network unit is required;
means for releasing the satellite connection as a response to a situation in which the information transfer between the first network unit and the second network unit is not required;
means for emulating, without communication the information transfer between the first network unit and the second network unit, signalling of the second network unit to the first network unit during a released state of the satellite connection; and
means for emulating, without the information transfer between the first network unit and the second network unit, signalling of the first network unit for the second network unit during the released state of the satellite connection.

39. A computer readable medium storing a computer program, executable by a processor to perform actions comprising:
establishing a satellite connection via a satellite when an information transfer between a first network unit and a second network unit is required;
releasing to a released state the satellite connection when the information transfer between the first network unit and the second network unit is not required; and
emulating, without the information transfer between the first network unit and the second network unit, signalling of the second network unit to the first network unit during the released state of the satellite connection.

40. An apparatus, comprising:
a transceiver configured to establish a satellite connection via a satellite when information transfer between a first network unit and a second network unit is required;
the transceiver configured to release to a released state the satellite connection when the information transfer between the first network unit and the second network unit is not required; and
an emulator coupled to the transceiver configured to emulate, without the information transfer between the first network unit and the second network unit, signalling of the second network unit to the first network unit during the released state of the satellite connection.

41. The apparatus of claim 40, wherein said signalling is LAPD link and Abis signalling.

42. The apparatus of claim 40, wherein said emulating signalling of the second network unit includes transferring state messages with the first network unit.

43. The apparatus according to claim 40, wherein said signalling is LAPD link and Abis signalling.

44. The apparatus according to claim 40, wherein said emulating signalling of the second network unit comprises transferring state messages with the first network unit.

45. The apparatus of claim 40, wherein capacity is reserved dynamically for an Abis link during an on-state of the satellite connection, the capacity being reserved based on a data transfer requirement.

* * * * *